United States Patent
Tripathy

(10) Patent No.: US 10,872,705 B2
(45) Date of Patent: Dec. 22, 2020

(54) ELECTROCHEMICAL CELLS FOR DIRECT OXIDE REDUCTION, AND RELATED METHODS

(71) Applicant: Battelle Energy Alliance, LLC, Idaho Falls, ID (US)

(72) Inventor: Prabhat K. Tripathy, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 15/886,041

(22) Filed: Feb. 1, 2018

(65) Prior Publication Data

US 2019/0237209 A1    Aug. 1, 2019

(51) Int. Cl.
| | |
|---|---|
| *G21C 19/48* | (2006.01) |
| *C25C 3/36* | (2006.01) |
| *C25C 3/34* | (2006.01) |
| *C25C 7/02* | (2006.01) |
| *G21C 19/50* | (2006.01) |

(52) U.S. Cl.
CPC ............... *G21C 19/48* (2013.01); *C25C 3/34* (2013.01); *C25C 3/36* (2013.01); *C25C 7/025* (2013.01); *G21C 19/50* (2013.01)

(58) Field of Classification Search
CPC ..................................................... C25C 7/025
See application file for complete search history.

(56) References Cited

U.S. PATENT DOCUMENTS

| | | |
|---|---|---|
| 3,711,385 A | 1/1973 | Beer |
| 3,897,265 A | 7/1975 | Auborn |
| (Continued) | | |

FOREIGN PATENT DOCUMENTS

| | | |
|---|---|---|
| EP | 2322693 B1 | 10/2017 |
| WO | 2005019501 A2 | 3/2005 |
| WO | 2017158335 A1 | 9/2017 |

OTHER PUBLICATIONS

Chang et al, Functional links between stability and reactivity of strontium ruthenate single crystals during oxygen evolution, Nature Communications, vol. 5, Jun. 2014, Article No. 4191 (Year: 2014).*

(Continued)

*Primary Examiner* — Harry D Wilkins, III
(74) *Attorney, Agent, or Firm* — TraskBritt

(57) ABSTRACT

A method of direct oxide reduction includes forming a molten salt electrolyte in an electrochemical cell, disposing at least one metal oxide in the electrochemical cell, disposing a counter electrode comprising a material selected from the group consisting of osmium, ruthenium, rhodium, iridium, palladium, platinum, silver, gold, lithium iridate, lithium ruthenate, a lithium rhodate, a lithium tin oxygen compound, a lithium manganese compound, strontium ruthenium ternary compounds, calcium iridate, strontium iridate, calcium platinate, strontium platinate, magnesium ruthenate, magnesium iridate, sodium ruthenate, sodium iridate, potassium iridate, and potassium ruthenate in the electrochemical cell, and applying a current between the counter electrode and the at least one metal oxide to reduce the at least one metal oxide. Related methods of direct oxide reduction and related electrochemical cells are also disclosed.

20 Claims, 4 Drawing Sheets

(56) References Cited

U.S. PATENT DOCUMENTS

| | | | |
|---|---|---|---|
| 4,187,155 | A | 2/1980 | de Nora et al. |
| 4,402,996 | A * | 9/1983 | Gauger ............... C25B 11/0489 |
| | | | 427/125 |
| 4,731,169 | A | 3/1988 | Lipsztajn |
| 6,103,090 | A * | 8/2000 | de Nora .................. C25C 7/025 |
| | | | 204/243.1 |
| 6,540,902 | B1 | 4/2003 | Redey et al. |
| 7,090,760 | B2 | 8/2006 | Seo et al. |
| 7,390,392 | B1 | 6/2008 | Choi et al. |
| 8,313,624 | B2 | 11/2012 | Fray et al. |
| 8,734,738 | B1 | 5/2014 | Herrmann |
| 9,017,527 | B2 | 4/2015 | Wiedmeyer et al. |
| 9,249,520 | B2 | 2/2016 | Withers et al. |
| 2004/0159559 | A1 * | 8/2004 | Fray .................... C22B 21/0038 |
| | | | 205/705 |
| 2008/0023321 | A1 | 1/2008 | Sadoway |
| 2010/0282602 | A1 * | 11/2010 | Fray ......................... C25C 3/28 |
| | | | 204/290.14 |
| 2012/0160704 | A1 * | 6/2012 | Wiedmeyer ............. C25C 7/005 |
| | | | 205/724 |
| 2013/0186769 | A1 * | 7/2013 | Powell ................... C25C 7/025 |
| | | | 205/343 |

OTHER PUBLICATIONS

Freund et al, Single crystal growth from separated educts and its application to lithium transition-metal oxides, Nature Scientific Reports, vol. 6, Oct. 2016, Article No. 35362 (Year: 2016).*

Hermann et al, Comparative study of monolithic platinum and iridium as oxygen-evolving anodes during the electrolytic reduction of uranium oxide in a molten LiCl—Li2O electrolyte, Journal of Applied Electrochemistry, vol. 49, No. 4, Feb. 2019, pp. 379-388 (Year: 2019).*

Kim et al , Electrolysis of Molten Iron Oxide with an Iridium Anode: The Role of Electrolyte Basicity, Journal of the Electrochemical Society, vol. 158, No. 10, Aug. 2011, pp. E101-E105, (Year: 2011).*

Park et al, A New Water Oxidation Catalyst: Lithium Manganese Pyrophosphate with Tunable Mn Valency, Journal of the American Chemical Society, vol. 136, No. 11, Feb. 2014, pp. 4201-4211 (Year: 2014).*

Kotz et al, XPS Studies of Oxygen Evolution on Ru and RuO2 Anodes, Journal of the Electrochemical Society, vol. 130, No. 4, Apr. 1983, pp. 825-829 (Year: 1983).*

Seitz et al, A highly active and stable IrOx/SrIrO3 catalyst for the oxygen evolution reaction, Science, vol. 353, Issue 6303, Sep. 2016, pp. 1011-1014 (Year: 2016).*

Yin et al, On the development of metallic inert anode for molten CaCl2—CaO System, Electrochimica Acta, vol. 56, No. 9, Mar. 2011, pp. 3296-3302 (Year: 2011).*

ASME International, "Report of the American Society of Mechalical Engineers' Technical Working Group on Inert Anode Technologies", CRTD—vol. 53, (Jul. 1999) 180 pages.

Barnett et al., "Reduction of Tantalum Pentoxide Using Graphite and Tin-Oxide-Based Anodes via the FFC-Cambridge Process", Metallurgical and Materials Transactions, vol. 40B, (Apr. 2009) pp. 150-157.

Brown et al., "A novel molten-salt electrochemical cell for investigating the reduction of uranium dioxide to uranium metal by lithium using in situ synchrotron radiation", Journal of Syncrotron Radiation, vol. 24 (2017) pp. 439-444.

Gibilaro et al., "Direct electrochemical reduction of solid uranium oxide in molten fluoride salts", Journal of Nuclear Materials, vol. 414, (2011) pp. 169-173.

* cited by examiner

US 10,872,705 B2

ELECTROCHEMICAL CELLS FOR DIRECT OXIDE REDUCTION, AND RELATED METHODS

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to electrochemical cells for reducing one or more oxides, and related methods. More particularly, embodiments of the disclosure relate to the direct oxide reduction (DOR) electrochemical cells for reducing one or more metal oxides at the cathode of the electrochemical cell, the electrochemical cell comprising one or more anode materials that are substantially inert in a molten salt electrolyte of the electrochemical cell, and related methods of reducing metal oxides in the electrochemical cell.

BACKGROUND

Processing of spent nuclear fuels is often performed with the goal of extracting uranium and plutonium from the spent nuclear fuels. One example of processing spent nuclear fuels is the so-called "Purex" process wherein the spent nuclear fuel is dissolved in nitric acid. Insoluble solids of the spent nuclear fuel are removed from the nitric acid solution. An organic solvent (e.g., tributyl phosphate (TBP)) mixed with a hydrocarbon solvent, such as kerosene, is used to extract the uranium and plutonium from the nitric acid solution to form $UO_2(NO_3)_2 \cdot 2TBP$ complexes and similar complexes of plutonium. The plutonium is subsequently separated from the uranium, such as by exposure to aqueous ferrous sulphamate.

Other methods of processing used oxide nuclear fuels include dissolving the used oxide nuclear fuel in an electrolyte and electrowinning the dissolved materials (e.g., dissolved uranium ions) by passing a current through the electrolyte including the dissolved materials. The current forces the dissolved uranium ions to move toward the cathode, where the uranium ions are reduced and deposited on the cathode surface.

In addition to nuclear fuels, many metal oxides may be purified and/or converted to their constituent metals in an electrochemical cell. Reduction of metal oxides in an electrochemical cell conventionally involves dissolution of the metal oxide in an electrolyte.

The electrolyte of such electrochemical cells may include a molten salt electrolyte. Conventional anode materials used in such electrochemical cells include graphite, tin oxide, cermets, ceramic materials, and metals such as platinum. The molten salt is often corrosive to one or more portions of the electrochemical cell, such as the anode. For example, molten salts that contain lithium may degrade platinum-containing anodes by way of forming lithium platinate ($Li_2PtO_3$). A portion of the lithium platinate dissolves in the molten salt electrolyte. Over time, the anode material is thinned and eventually dissolves completely in the molten salt electrolyte or otherwise becomes unusable in the electrochemical cell.

In addition, depending on the particular configuration of the electrochemical cell, oxygen gas may evolve at the anode. The evolved oxygen may react with the platinum anode to form oxides of platinum (e.g., platinum (II) oxide (PtO), platinum (IV) oxide ($PtO_2$), $Pt_3O_4$) that dissolve in the molten salt electrolyte. Since the oxides of platinum are soluble in the molten salt electrolyte, the anode material is dissolved in the molten salt electrolyte and, as a result, the anode material is thinned, further reducing the usable life of the anode. In addition, spent nuclear fuels include fission byproducts, which often include corrosive gases such as selenium, tellurium, and iodine. Under operating conditions of the electrochemical cell, these corrosive gases undesirably react with the anode to form soluble intermetallic compounds. As the soluble intermetallic compounds form and dissolve in the molten salt, the anode is further degraded. Over time, as more platinum reacts with the components of the molten salt (e.g., lithium oxide ions, and corrosive gases), the platinum anode material is progressively thinned and consumed in the electrochemical cell.

As another example, graphite-containing anodes may react with the oxide ions in the electrochemical cell, generating carbon dioxide and carbon monoxide, as well as carbon dusts on the surface of the molten salt electrolyte. The carbon dust contaminates the components of the electrochemical cell. The generation of carbon dioxide, carbon monoxide, and carbon dust consumes the graphite anode. As the anode thins and is consumed in the electrochemical cell, long term operation of the electrochemical cell is hindered. If sufficient portions of the anode material are consumed, the anode needs to be replaced for the desired electrolytic reduction reaction to proceed.

BRIEF SUMMARY

Embodiments disclosed herein include methods of reducing metal oxides with a molten salt electrolyte and to related methods. For example, in accordance with one embodiment, a method of reducing spent nuclear fuels comprising uranium oxide comprises providing an electrochemical cell comprising a working electrode, and a counter electrode comprising one or more materials selected from the group consisting of osmium, ruthenium, rhodium, iridium, palladium, silver, gold, lithium iridate, lithium ruthenate, lithium rhodates, a lithium tin oxygen compound, a lithium manganese compound, strontium ruthenium ternary compounds, calcium iridate, strontium iridate, calcium platinate, strontium platinate, magnesium ruthenate, magnesium iridate, sodium ruthenate, sodium iridate, potassium iridate, and potassium ruthenate, disposing a uranium oxide material on or proximate the working electrode, exposing the uranium oxide to a molten salt electrolyte comprising at least one of lithium chloride, lithium oxide, calcium chloride, calcium oxide, and sodium chloride, and providing an electric current between the counter electrode and the working electrode to reduce the uranium oxide material.

In additional embodiments, a method of direct oxide reduction comprises forming a molten salt electrolyte in an electrochemical cell, disposing at least one metal oxide in the electrochemical cell, disposing a counter electrode comprising a material selected from the group consisting of osmium, ruthenium, rhodium, iridium, palladium, platinum, silver, gold, lithium iridate, lithium ruthenate, a lithium rhodate, a lithium tin oxygen compound, a lithium manganese compound, strontium ruthenium ternary compounds, calcium iridate, strontium iridate, calcium platinate, strontium platinate, magnesium ruthenate, magnesium iridate, sodium ruthenate, sodium iridate, potassium iridate, and potassium ruthenate in the electrochemical cell, and applying a current between the counter electrode and the at least one metal oxide to reduce the at least one metal oxide.

In further embodiments, an electrochemical cell comprises a counter electrode comprising a material selected from the group consisting of osmium, ruthenium, rhodium, iridium, palladium, platinum, silver, gold, lithium iridate, lithium ruthenate, a lithium rhodate, a lithium tin oxygen compound, a lithium manganese compound, strontium ruthenium ternary compounds, calcium iridate, strontium iridate, calcium platinate, strontium platinate, magnesium ruthenate, magnesium iridate, sodium ruthenate, sodium iridate, potassium iridate, and potassium ruthenate, a working electrode comprising a metal oxide to be reduced in the electrochemical call, and a molten salt electrolyte comprising a molten salt comprising at least one of an alkali halide salt and an alkaline earth metal halide salt.

DETAILED DESCRIPTION

Figure 1:
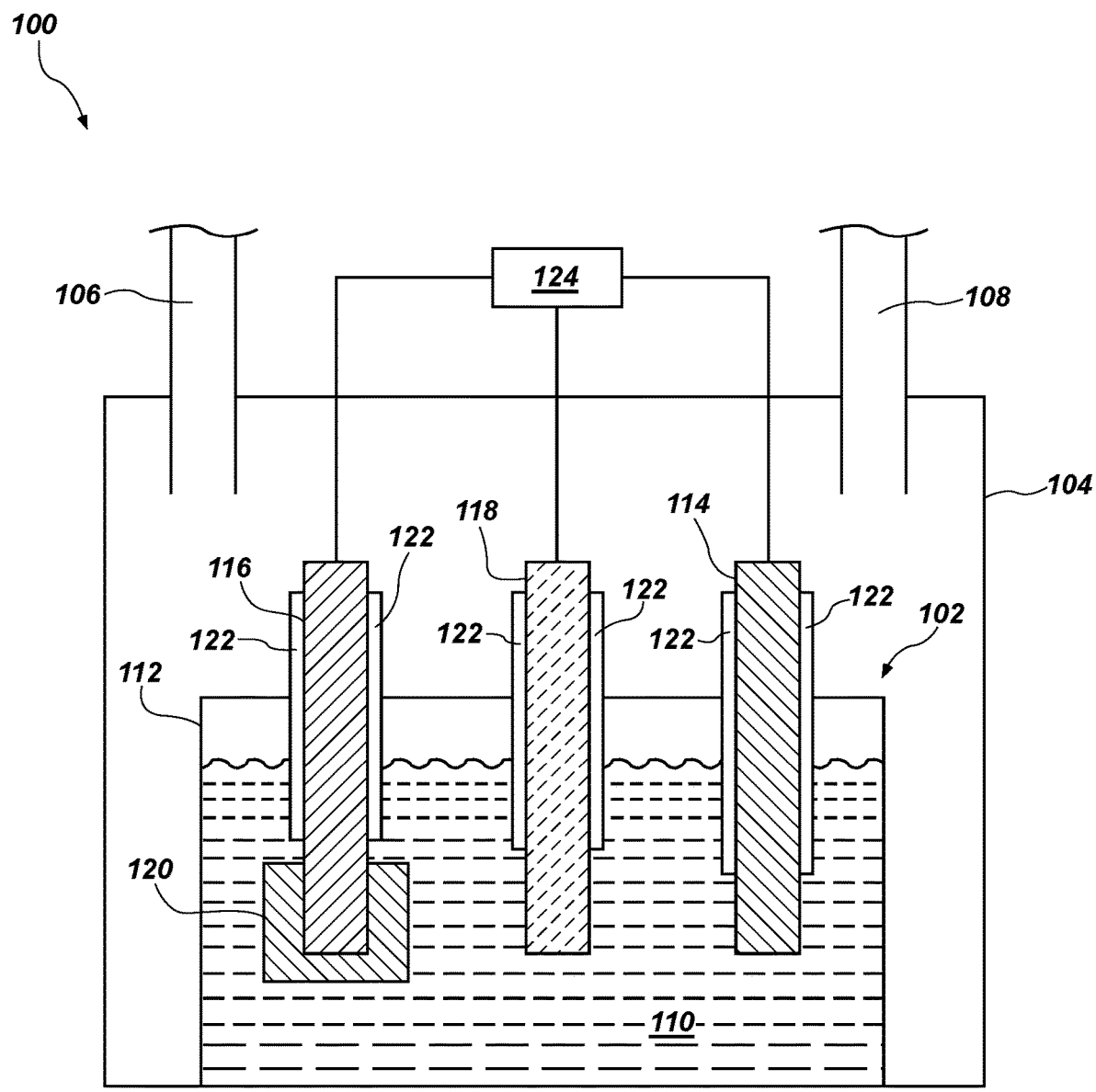
FIG. 1 is a simplified schematic of an electrochemical cell for direct oxide reduction, in accordance with embodiments of the disclosure.

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, system or method for reducing a metal oxide. Only those process acts and structures necessary to understand the embodiments of the disclosure are described in detail below. Additional acts to reduce a metal oxide may be performed by conventional techniques. Also note, any drawings accompanying the present application are for illustrative purposes only, and are thus not drawn to scale. Additionally, elements common between figures may retain the same numerical designation.

As used herein, the term "platinum group metal" (PGM) means and includes a metal including at least one of ruthenium, osmium, rhodium, iridium, palladium, and platinum.

According to embodiments described herein, an electrochemical cell comprises a molten salt electrolyte, a counter electrode (e.g., an anode) in contact with the molten salt electrolyte, and a working electrode (e.g., a cathode) in contact with the molten salt electrolyte. The molten salt electrolyte includes a molten salt of an alkali metal halide salt, an alkaline earth metal halide salt, an alkali metal oxide, an alkaline earth metal oxide, or combinations thereof. The working electrode may comprise a metal oxide to be reduced in the electrochemical cell or the metal oxide to be reduced may be in direct contact with the working electrode. In some embodiments, the working electrode consists essentially of the metal oxide to be reduced. The metal oxide may comprise a transition metal oxide, a lanthanide oxide, an actinide oxide, or combinations thereof. In some embodiments, the metal oxide comprises spent uranium oxide nuclear fuel (e.g., depleted uranium oxide fuel), unirradiated nuclear fuel (e.g., enriched uranium oxide fuel), or combinations thereof. In use and operation, the metal oxide is reduced at the working electrode and oxide ions are generated at the working electrode. The reduced metal remains at the working electrode and the oxide ions are dissolved in the molten salt electrolyte. Accordingly, the metal is not substantially dissolved in the molten salt electrolyte. Responsive to exposure to an electric current between the counter electrode and the working electrode, the oxide ions move from the working electrode to the counter electrode through the molten salt electrolyte.

The counter electrode comprises a material that is substantially inert or otherwise not substantially consumed in the electrochemical cell. In some embodiments, the counter electrode comprises a material that is stable in an oxidizing atmosphere at an operating temperature of the electrochemical cell. In some embodiments, the material of the counter electrode comprises at least one platinum group metal (PGM), at least one precious metal (e.g., gold or silver), or a combination thereof. By way of nonlimiting example, the counter electrode is selected from the group consisting of at least one of osmium, ruthenium, rhodium, iridium, palladium, platinum, silver, gold, lithium iridate ($Li_2IrO_3$), lithium ruthenate ($Li_2RuO_3$), a lithium rhodate ($LiRhO_2$, $LiRhO_3$), a lithium tin oxygen compound (e.g., $Li_2SnO_3$), a lithium manganese oxygen compound (e.g., $Li_2MnO_3$), calcium ruthenate ($CaRuO_3$), strontium ruthenium ternary compounds (e.g., $SrRuO_3$, $Sr_2RuO_3$, $Sr_2RuO_4$), $CaIrO_3$, strontium iridate (e.g., $SrIrO_3$, $SrIrO_4$, $Sr_2IrO_4$), calcium platinate ($CaPtO_3$), strontium platinate ($SrPtO_4$), magnesium ruthenate ($MgRuO_4$), magnesium iridate ($MgIrO_4$), sodium ruthenate ($Na_2RuO_4$), sodium iridate ($Na_2IrO_3$), potassium iridate ($K_2IrO_3$), and potassium ruthenate ($K_2RuO_4$).

In some embodiments, the counter electrode comprises a substrate comprising a different material than the at least one platinum group metal or the at least one precious metal and the substrate is coated with the material of the counter electrode. The counter electrode may be substantially inert in the electrochemical cell. The counter electrode may resist attack from the molten salt electrolytes, which may be corrosive at high temperatures (e.g., greater than about 600° C., greater than about 800° C., etc.) under oxidizing conditions. The counter electrode may exhibit good electrical conductivity suitable for operation in the electrochemical cell. Accordingly, the material of the counter electrode may not be consumed during the electrochemical reduction reaction (e.g., direct oxide reduction) and the counter electrode may not need to be replaced as in conventional electrochemical cells.

FIG. 1 is a simplified schematic of a system 100 including an electrochemical cell 102 for reducing one or more metal oxides to form one or more metals. The electrochemical cell 102 may be configured as a so-called "direct oxide reduction" (DOR) electrochemical cell. In other words, the electrochemical cell 102 may be configured to reduce one or more oxides.

The electrochemical cell 102 may be contained within a gas-tight enclosure 104, which may include an inlet 106 and an outlet 108. The inlet 106 is configured for providing, for example, a gas to the enclosure 104 for maintaining a gas pressure within the enclosure 104. Gases may be removed from the enclosure 104 via the outlet 108. In some embodiments, the gas comprises an inert gas, such as argon, helium, or a combination thereof. The enclosure 104 may include a furnace or other heating element for heating or maintaining a temperature of a molten salt electrolyte 110 in the electrochemical cell 102. Although FIG. 1 illustrates that the enclosure 104 include the inlet 106 and the outlet 108, the disclosure is not so limited. In other embodiments, the enclosure 104 may be configured as a so-called "glove box" wherein the enclosure is not configured with an inlet 106 and an outlet 108 for gas flow into and out of the electrochemical cell 102 during operation thereof.

The electrochemical cell 102 may include a crucible 112 comprising a metal, glassy carbon, ceramic, a metal alloy, or another material. In some embodiments, the crucible 112 comprises a non-metallic material, such as alumina ($Al_2O_3$), magnesia (MgO), glass carbon, graphite, boron nitride, another material, or combinations thereof. In other embodiments, the crucible comprises a metal or metal alloy, such as, for example, nickel, molybdenum, tantalum, stainless steel, alloys of nickel and copper, alloys of nickel, chromium, iron, and molybdenum, alloys of nickel, iron, and molybdenum, and combinations thereof.

The molten salt electrolyte 110 may be disposed in the crucible 112. The electrochemical cell 102 may further include at least one counter electrode 114 (which may also be referred to as an anode) and at least one working electrode 116 (which may also be referred to as a cathode). In some embodiments, the electrochemical cell 102 further includes a reference electrode 118 configured for monitoring a potential in the electrochemical cell 102. In some embodiments, a sheath 122 is disposed around at least a portion of one or more of the counter electrode 114, the working electrode 116, and the reference electrode 118. The sheath 122 may be configured to provide electrical insulation between the respective electrodes and the crucible 112. In some embodiments, the sheath 122 comprises alumina (e.g., an alumina tube), magnesia, or a combination thereof.

The reference electrode 118 may be in electrical communication with the counter electrode 114 and the working electrode 116 and may be configured to monitor the potential difference between the counter electrode 114 and the working electrode 116. Accordingly, the reference electrode 118 may be configured to monitor the cell potential of the electrochemical cell 102.

The reference electrode 118 may include nickel, nickel/nickel oxide, glassy carbon, silver/silver chloride, one or more platinum group metals, one or more precious metals (e.g., gold), or combinations thereof. In some embodiments, the reference electrode 118 comprises glassy carbon. In other embodiments, the reference electrode 118 comprises nickel, nickel oxide, or a combination thereof. In yet other embodiments, the reference electrode 118 comprises silver/silver chloride.

A potentiostat 124 may be electrically coupled to each of the counter electrode 114, the working electrode 116, and the reference electrode 118. The potentiostat 124 may be configured to measure and/or provide an electric potential between the counter electrode 114 and the working electrode 116. The difference between the electric potential of the counter electrode 114 and the electric potential of the working electrode 116 may be referred to as a cell potential of the electrochemical cell 102.

The system 100 may be configured to reduce one or more metal oxides to a substantially pure metal (e.g., a metal in a substantially unoxidized state) or a metal alloy. In some such embodiments, the working electrode 116 includes at least one oxide (e.g., at least one metal oxide) to be reduced in the electrochemical cell 102.

The working electrode 116 may be in electrical communication with a basket 120 configured to carry one or more metals to be reduced in the electrochemical cell 102. The basket 120 may comprise nickel, cobalt, iron, molybdenum, stainless steel, alloys of nickel and copper, alloys of nickel, chromium, iron, and molybdenum, alloys of nickel, iron, and molybdenum, another material, or combinations thereof. In some embodiments, the basket 120 comprises nickel. In other embodiments, the electrochemical cell 102 does not include the basket 120 and the working electrode 116 comprises the metal oxide or a combination of metal oxides to be electrolytically reduced in the electrochemical cell 102. Stated another way, in some embodiments, the working electrode 116 comprises one or more metal oxides that are reduced to a metal (e.g., a substantially pure metal or a metal alloy) in the electrochemical cell 102. In some embodiments, the working electrode 116 consists essentially of the metal oxide, which may comprise one or more metals to be reduced.

At least one of the working electrode 116 and the metal in the basket 120 may comprise a metal oxide. The metal oxide may comprise a transition metal oxide (such as a refractory metal oxide (e.g., titanium oxide, (TiO), titanium dioxide ($TiO_2$), zirconium oxide ($ZrO_2$), hafnium oxide ($HfO_2$), vanadium oxide ($V_2O_5$), niobium oxide ($NbO_2$, $Nb_2O_5$), tantalum pentoxide ($Ta_2O_5$), chromium oxide (CrO, $Cr_2O_3$, etc.), manganese oxide (MnO), nickel oxide (NiO), molybdenum oxide ($MoO_3$), tungsten oxide ($WO_3$, $WO_2$), ruthenium oxide ($RuO_2$), osmium oxide ($OsO_2$, $OsO_4$), rhodium oxide ($Rh_2O_3$), iridium oxide ($IrO_2$)), iron oxide ($Fe_2O_3$, $Fe_3O_4$, etc.), cobalt oxide (CoO, $Co_2O_3$, $Co_3O_4$), nickel oxide (NiO, $Ni_2O_3$)), non-metal oxides (e.g., silicon dioxide ($SiO_2$)), a lanthanide oxide (e.g., lanthanum oxide ($La_2O_3$)), cerium oxide ($CeO_2$), neodymium oxide ($Nd_2O_3$), samarium oxide ($Sm_2O_3$), dysprosium oxide ($Dy_2O_3$), another oxide of a lanthanide element), an actinide oxide (e.g., actinium oxide ($Ac_2O_3$), thorium oxide ($ThO_2$), uranium oxide (e.g., $UO_2$), an oxide of another actinide element), or combinations thereof. In some embodiments, the metal oxide comprises an unirradiated nuclear fuel, such as enriched uranium oxide. In other embodiments, the metal oxide comprises a spent nuclear fuel, such as spent uranium oxide (e.g., $UO_2$, $U_3O_8$, or a combination thereof). In some embodiments, the metal oxide comprises an oxide of more than one metal. Reduction of such oxides may form a metal alloy comprising the constituent metals of the metal oxides. In some embodiments, the metal oxide is disposed in the basket 120 and in electrical communication with the working electrode 116. In other embodiments, the working electrode 116 consists essentially of the metal oxide.

The molten salt electrolyte 110 may include a material formulated and configured to facilitate reduction of the metal oxides. In some embodiments, the molten salt electrolyte 110 comprises an alkali halide salt, an alkaline earth metal halide salt, an alkali oxide, an alkaline earth metal oxide, or combinations thereof. By way of nonlimiting example, the molten salt electrolyte 110 may include lithium chloride (LiCl), lithium oxide (Li$_2$O), sodium chloride (NaCl), calcium chloride (CaCl$_2$), calcium oxide (CaO), lithium bromide (LiBr), potassium bromide (KBr), cesium bromide (CsBr), calcium bromide (CaBr$_2$), potassium chloride (KCl), potassium bromide (KBr), strontium chloride (SrCl$_2$), strontium bromide (SrBr$_2$), or combinations thereof. In some embodiments, the molten salt electrolyte 110 comprises a eutectic mixture of sodium chloride and potassium chloride, and may further include calcium oxide.

In some embodiments, the molten salt electrolyte 110 comprises lithium chloride and lithium oxide (LiCl—Li$_2$O). In some such embodiments, the lithium oxide constitutes between about 1.0 weight percent (wt. %) and about 5.0 weight percent of the molten salt electrolyte 110, such as between about 1.0 weight percent and about 2.0 weight percent, between about 2.0 weight percent and about 3.0 weight percent, or between about 3.0 weight percent and about 5.0 weight percent of the molten salt electrolyte 110. The lithium chloride may constitute a remainder of the molten salt electrolyte 110. In some embodiments, the lithium oxide constitutes about 1.0 weight percent of the molten salt electrolyte 110. In other embodiments, the lithium oxide constitutes about 5.0 weight percent of the molten salt electrolyte 110. In some embodiments, the molten salt electrolyte 110 comprises lithium chloride and lithium oxide and the metal oxide comprises uranium oxide. In other embodiments, the metal oxide comprises one or more of manganese oxide, nickel oxide, and titanium monoxide.

In other embodiments, the molten salt electrolyte 110 comprises calcium chloride and calcium oxide (CaCl$_2$—CaO). In some such embodiments, the calcium oxide constitutes between about 1.0 weight percent and about 5.0 weight percent of the molten salt electrolyte 110, such as between about 1.0 weight percent and about 2.0 weight percent, between about 2.0 weight percent and about 3.0 weight percent, or between about 3.0 weight percent and about 5.0 weight percent of the molten salt electrolyte 110. The calcium chloride may constitute a remainder of the molten salt electrolyte 110. In some embodiments, the calcium oxide constitutes about 1.0 weight percent of the molten salt electrolyte 110. In other embodiments, the calcium oxide constitutes about 5.0 weight percent of the molten salt electrolyte 110. In some embodiments, the molten salt electrolyte 110 comprises calcium chloride and calcium oxide and the metal oxide comprises tantalum pentoxide, titanium oxide, a lanthanide oxide, an actinide oxide, or combinations thereof.

The molten salt electrolyte 110 may be maintained at a temperature such that the molten salt electrolyte 110 is and remains in a molten state. In other words, the temperature of the molten salt electrolyte 110 may be maintained at or above a melting temperature of the molten salt electrolyte 110. By way of nonlimiting example, where the molten salt electrolyte 110 comprises lithium chloride and lithium oxide, the temperature of the molten salt electrolyte 110 may be between about 650° C. and about 700° C. Where the molten salt electrolyte 110 comprises calcium chloride and calcium oxide, the temperature of the molten salt electrolyte 110 may be between about 800° C. and about 950° C. Where the molten sale electrolyte 110 comprises sodium chloride and calcium chloride, the temperature thereof may be maintained between about 550° C. and about 950° C. However, the disclosure is not so limited and the temperature of the molten salt electrolyte 110 may be different than those described above.

The molten salt electrolyte 110 may facilitate reduction of the metal oxide. In some embodiments, the metal oxide may be reduced at the cathode 116, according to Equation (1) below:

$$M_yO_x(s) + ze^- \rightarrow y\, M + z/x\, O^{2-} \qquad (1),$$

wherein M is a metal (e.g., a transition metal, a lanthanide, an actinide, etc.), M$_y$O$_x$ is the metal oxide, x is the stoichiometric amount of oxygen for the particular metal oxide, y is the stoichiometric amount of the metal in the metal oxide, and z is the stoichiometric amount of electrons for balancing the chemical reaction. The electrons are provided in the electrochemical cell 102 by provision of current to the working electrode 116, such as through the potentiostat 124.

The oxide ions generated at the working electrode 116 may be transported from the working electrode 116 to the counter electrode 114 responsive to exposure to the applied electrical field (i.e., a polarization between the counter electrode 114 and the working electrode 116, provided by the potentiostat 124). The oxide ions may be oxidized at the counter electrode 114 according to Equation (2) below:

$$2O^{2-} \rightarrow O_2(g) + 4e^- \qquad (2).$$

The oxygen gas generated at the counter electrode 114 may be evolved at the counter electrode 114. The electrons may be returned to the working electrode 116 surface.

In use and operation, the metal oxide may be disposed in the electrochemical cell 102 and in contact with the molten salt electrolyte 110. An electric potential may be applied between the counter electrode 114 and the working electrode 116, providing a polarization field and a driving force for moving oxide ions dissolved from the metal oxide at the working electrode 116 to the counter electrode 114, facilitating reduction of the metal oxide at the working electrode 116.

As described above, upon depositing the electrons at the counter electrode 114, the oxide anions may evolve as oxygen gas at the counter electrode 114. The counter electrode 114 may be formulated and configured to be substantially inert to the molten salt electrolyte 110, the oxide ions, and the oxygen gas. In addition, the counter electrode 114 may be substantially inert to gases that may evolve from the metal oxide. For example, where the metal oxide comprises a spent nuclear fuel, the metal oxide may include fission byproducts, such as selenium, tellurium, or iodine. The counter electrode 114 may be substantially inert to such gases. Accordingly, the counter electrode 114 may include a material formulated and configured to be substantially inert in the electrochemical cell 102 at operating conditions thereof.

The counter electrode 114 may include a platinum group metal (PGM), a precious metal (e.g., silver or gold), or a combination thereof. By way of nonlimiting example, the counter electrode 114 may include ruthenium, osmium, rhodium, iridium, palladium, platinum, silver, gold, or combinations thereof. In some embodiments, the counter electrode 114 includes a ternary compound including a platinum group metal, oxygen, and one of an alkali metal and an alkaline earth metal. The ternary compound may have a general formula of M$_1$M$_2$O$_x$, wherein M$_1$ is one or more of lithium, sodium, potassium, magnesium, calcium, or strontium, M$_2$ is a platinum group metal such as ruthenium, osmium, rhodium, iridium, palladium, platinum, and combinations thereof, and x is an integer, such as 2, 3 or 4, depending on $M_1$. In other embodiments, $M_2$ may be tin or manganese. By way of nonlimiting example, the counter electrode 114 may comprise lithium iridate ($Li_2IrO_3$), lithium ruthenate ($Li_2RuO_3$), lithium rhodates ($LiRhO_2$, $LiRhO_3$), a lithium tin oxygen compound (e.g., $Li_2SnO_3$), a lithium manganese oxygen compound ($Li_2MnO_3$), calcium ruthenate ($CaRuO_3$), strontium ruthenium ternary compounds ($SrRuO_3$, $Sr_2RuO_3$, $Sr_2RuO_4$), calcium iridate ($CaIrO_3$), strontium iridate ($SrIrO_3$, $SrIrO_4$, $Sr_2IrO_4$), calcium platinate ($CaPtO_3$), strontium platinate ($SrPtO_4$), magnesium ruthenate ($MgRuO_4$), magnesium iridate ($MgIrO_4$), sodium ruthenate ($Na_2RuO_4$), sodium iridate ($Na_2IrO_3$), potassium iridate ($K_2IrO_3$), and potassium ruthenate ($K_2RuO_4$), and combinations thereof. In some embodiments, where the counter electrode 114 comprises a ternary compound, $M_1$ may be selected to comprise a material of the molten salt electrolyte 110. By way of nonlimiting example, where the molten salt electrolyte comprises lithium (e.g., $LiCl/Li_2O$), $M_1$ may be selected to be lithium. Similarly, where the molten salt electrolyte 110 comprises calcium (e.g., $CaCl_2/CaO$), $M_1$ may be selected to be calcium.

In some embodiments, the counter electrode 114 comprises a monolithic material. In some such embodiments, the counter electrode 114 comprises a monolithic metal, such as monolithic iridium, monolithic ruthenium, monolithic osmium, monolithic rhodium, monolithic palladium, or monolithic platinum. In other embodiments, the counter electrode 114 comprises a monolithic structure of one of lithium iridate, lithium ruthenate, a lithium rhodate, a lithium tin oxygen compound, a lithium manganese compound, calcium ruthenate, a strontium ruthenium ternary compound, calcium iridate, strontium iridate, calcium platinate, strontium platinate, magnesium ruthenate, magnesium iridate, sodium ruthenate, sodium iridate, potassium iridate, potassium ruthenate, or combinations thereof.

Figure 2:
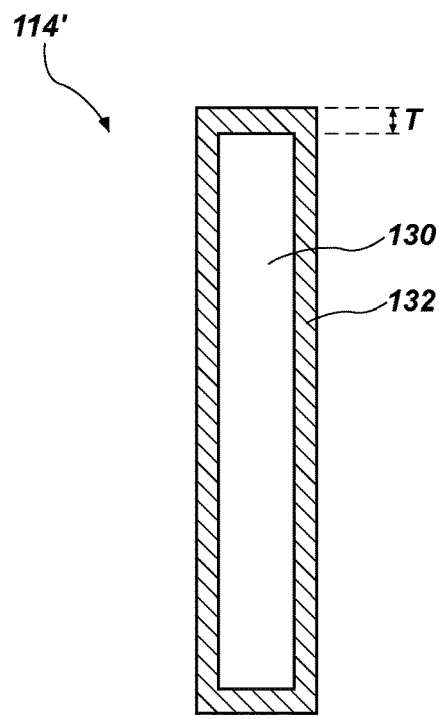
FIG. 2 is a simplified cross-sectional view of an anode for the electrochemical cell, in accordance with embodiments of the disclosure.

As illustrated in FIG. 1, the counter electrode 114 may comprise a monolithic body comprising a substantially uniform composition. In other embodiments, the counter electrode 114 may comprise a base material (e.g., a substrate) coated with counter electrode material formulated and configured to be substantially inert in the electrochemical cell 102. FIG. 2 is a simplified cross-sectional view of a counter electrode 114', in accordance with some embodiments of the disclosure. The counter electrode 114' may comprise a substrate (e.g., a core) 130 and a coating material 132. The coating material 132 may include one or more of the materials described above with reference to the counter electrode 114 of FIG. 1. For example, the coating material 132 may comprise ruthenium, osmium, rhodium, iridium, palladium, platinum, silver, gold, lithium iridate, lithium ruthenate, a lithium rhodate, a lithium tin oxygen compound, a lithium manganese compound, calcium ruthenate, a strontium ruthenium ternary compound, calcium iridate, strontium iridate, calcium platinate, strontium platinate, magnesium ruthenate, magnesium iridate, sodium ruthenate, sodium iridate, potassium iridate, potassium ruthenate, or combinations thereof.

The coating material 132 may be substantially uniform over surfaces of the substrate 130. The coating material 132 may have a thickness T between about 1.0 mm and about 7.0 mm, such as between about 1.0 mm and about 3.0 mm, between about 3.0 mm and about 5.0 mm, or between about 5.0 mm and about 7.0 mm. In some embodiments, the thickness T is between about 3.0 mm and about 5.0 mm.

The substrate 130 may comprise a material that is different than the coating material 132. The substrate 130 may comprise a metal or a non-metal. The substrate 130 may be selected to exhibit a coefficient of thermal expansion substantially similar to a coefficient of thermal expansion of the coating material 132. By way of nonlimiting example, the substrate 130 may comprise graphite (e.g., high density graphite), nickel, molybdenum, tantalum, chromium, tungsten, titanium, or another material. In some embodiments, the substrate 130 comprises high density graphite.

Figure 3:
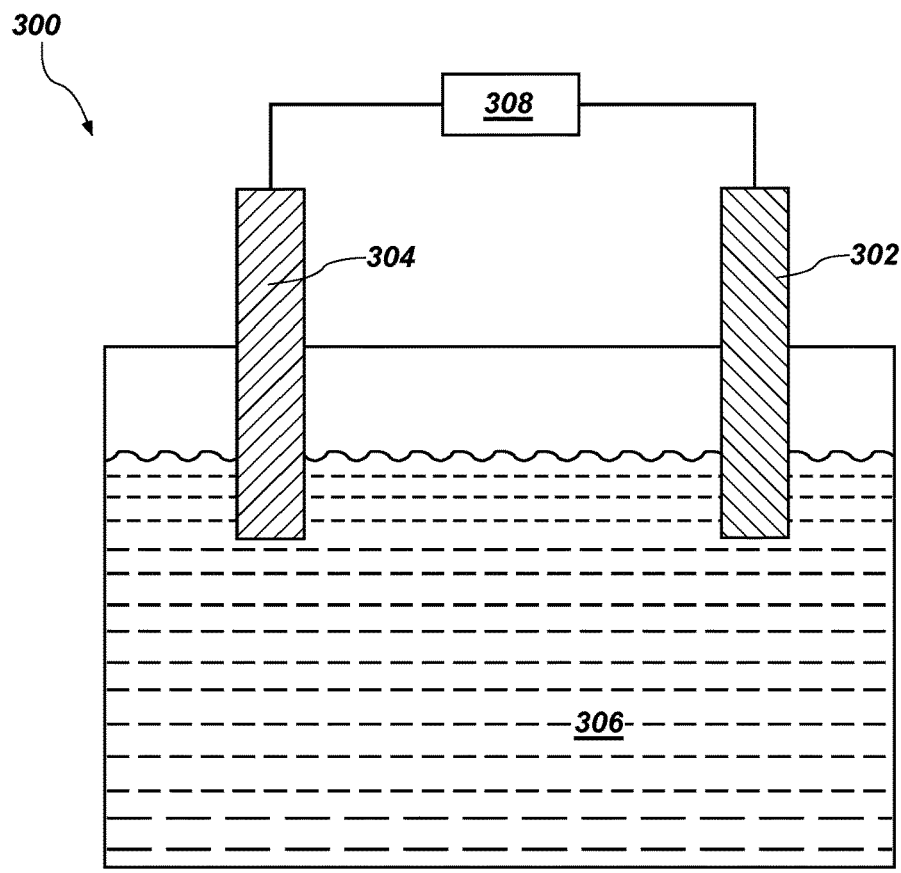
FIG. 3 is a simplified schematic of an electrochemical cell for forming the anode of FIG. 2, in accordance with embodiments of the disclosure.

Referring to FIG. 3, an electrochemical cell 300 for forming the counter electrode 114' (FIG. 2) is illustrated. The electrochemical cell 300 includes an anode 302 and a cathode 304 immersed in a molten salt electrolyte 306. A power source 308, such as a direct current power source, may be operably coupled to the anode 302 and the cathode 304 for providing an electric potential between the anode 302 and the cathode 304 and a driving force for electrochemical reactions that may occur within the electrochemical cell 300.

The electrochemical cell 300 may be configured as an electroplating electrochemical cell, wherein one or more components of the molten salt electrolyte 306 comprises a material to be deposited on the cathode 304. The molten salt electrolyte 306 may be formulated and configured to include at least one component of the coating material 132 (FIG. 2) of the counter electrode 114' (FIG. 2). The molten salt electrolyte 306 may include, for example, a fluoride salt, chloride salt, a bromide salt, or another salt of one or more of ruthenium, osmium, rhodium, iridium, palladium, platinum, gold, and silver. By way of nonlimiting example, the molten salt electrolyte 306 may include ruthenium fluoride ($RuF_3$, $RuF_4$, $RuF_6$, ($RuF_5$)$_4$), ruthenium chloride ($RuCl_2$, $RuCl_3$), ruthenium bromide ($RuBr_3$), osmium fluoride ($OsF_6$), osmium chloride ($OsCl_3$, $OsCl_4$), osmium bromide ($OsBr_3$, $OsBr_4$), rhodium chloride ($RhCl_3$), rhodium ($RhBr_3$), iridium fluoride ($IrF_3$, $IrF_4$, $IrF_6$), iridium chloride ($IrCl_2$, $IrCl_3$, $IrCl_4$), iridium bromide ($IrBr_3$, $IrBr_4$), palladium fluoride ($PdF_2$, $PdF_4$), palladium chloride ($PdCl_2$), palladium bromide ($PdBr_2$), platinum fluoride ($PtF_4$, ($PtF_5$)$_4$, $PtF_6$), platinum chloride ($PtCl_2$, $PtCl_3$, $PtCl_4$), platinum bromide ($PtBr_2$, $PtBr_3$, $PtBr_4$), silver fluoride ($AgF$), silver chloride ($AgCl$), silver bromide ($AgBr$), gold fluoride ($AuF_3$, $AuF_5$), gold chloride ($AuCl$, $AuCl_3$), gold bromide ($AuBr$, ($AuBr_3$)$_2$), potassium hexachlorosmate ($K_2OsCl_6$), $H_2PtCl_6$, $(NH_4)_2PtCl_6$, $Pt(NO_2)_2(NH_3)_2$, $K_2Pt(NO_2)_4$, $Na_6Pt(SO_3)_4$, $Na_6Pt(SO_3)_4$, or combinations thereof.

The anode 302 may include graphite, glassy carbon, nickel, cobalt, molybdenum, tantalum, tungsten, a platinum group metal, or another material. In some embodiments, the anode 302 comprises graphite. In some embodiments, where the anode 302 comprises molybdenum, tantalum, tungsten, or combinations thereof, the electrolyte 306 may comprise a bromide salt including at least one platinum group metal. In other embodiments, where the electrolyte 306 comprises dissolved platinum group metals dissolved in a chloride salt, a fluoride salt, or a combination thereof, the anode 302 may comprise graphite or glassy carbon. In further embodiments, where the anode 302 comprises a platinum group metal, the electrolyte 306 may comprise a bromide salt, a fluoride salt, a chloride salt, or combinations thereof.

The cathode 304 may include any material on which the coating material 132 (FIG. 2) may be formed (i.e., a suitable substrate 130 (FIG. 2)). Stated another way, the cathode 304 may correspond to the substrate 130 (FIG. 2) and may include any of the materials described above with reference to the substrate 130. By way of nonlimiting example, the cathode 304 may include graphite (e.g., high density graphite), nickel, molybdenum, tantalum, titanium, chromium, tungsten, another material, or combinations thereof.

Application of an electric potential between the anode 302 and the cathode 304 may cause dissolved ions (one or more of dissolved ruthenium, osmium, rhodium, iridium, palladium, platinum, silver, and gold ions) to move to the cathode 304, where such ions may be deposited to form a coating (e.g., the coating material 132 (FIG. 2)). After a sufficient duration, the cathode 304 may be coated to a desired thickness and the cathode 304 is removed from the electrochemical cell 300.

In some embodiments, after removing the cathode 304 from the electrochemical cell 300, the cathode 304 is annealed, such as by exposing the cathode 304 to a temperature greater than about 1,000° C., greater than about 1,100° C., greater than about 1,200° C., greater than about 1,300° C., greater than about 1,400° C., greater than about 1,500° C., greater than about 1,600° C., greater than about 1,700° C., greater than about 1,800° C., greater than about 1,900° C., or even greater than about 2,000° C. In some embodiments, the annealing temperature may be less than a melting temperature of the coating material 132 (e.g., less than about 75% of the melting temperature of the coating material 132 in degrees Celsius).

The cathode 304 may be exposed to the annealing temperature for a duration between about 2 hours and about 7 days, such as between about 2 hours and about 6 hours, between about 6 hours and about 12 hours, between about 12 hours and about 1 day, between about 1 day and about 2 days, between about 2 days and about 3 days, between about 3 days and about 5 days, or between about 5 days and about 7 days.

The annealed cathode 304 may be used as a counter electrode (e.g., the counter electrode 114' (FIG. 2)) in the electrochemical cell 102 (FIG. 1) for reducing metal oxides at the cathode 116 (FIG. 1).

Although the counter electrode 114' (FIG. 2) has been described as being formed in the electroplating electrochemical cell 300 (FIG. 3), the disclosure is not so limited. In other embodiments, the counter electrode 114' may be formed by depositing the coating 132 (FIG. 2) on the substrate 130 (FIG. 1). By way of nonlimiting example, the coating 132 may be formed on the substrate 130 by chemical vapor deposition (CVD), physical vapor deposition (PVD), atomic layer deposition (ALD), plasma-enhanced chemical vapor deposition (PECVD), or another deposition method.

Figure 4:
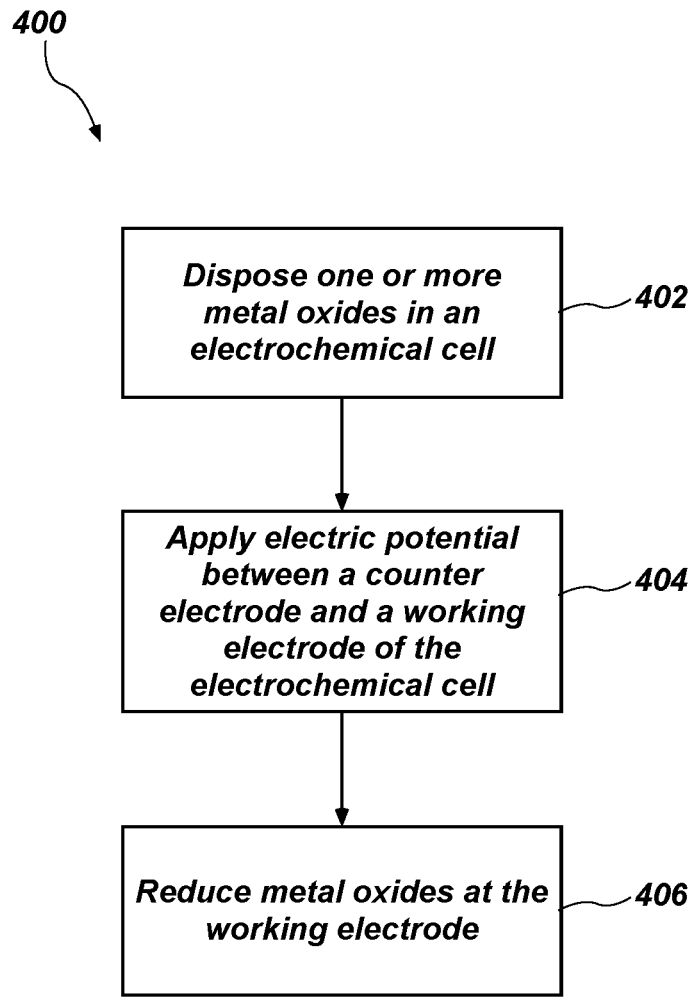
FIG. 4 is a simplified flow diagram of a method of reducing one or more metal oxides, in accordance with embodiments of the disclosure.

FIG. 4 is a simplified flow diagram of a method 400 of reducing one or more metal oxides in an electrochemical cell, in accordance with embodiments of the disclosure. The method 400 includes act 402, including disposing one or more metal oxides in an electrochemical cell; act 404 including applying electric potential between a counter electrode and a working electrode of the electrochemical cell; and act 406 including reducing metal oxides at the cathode to form a substantially pure metal or a metal alloy.

Act 402 may include disposing one or more metal oxides in an electrochemical cell. The electrochemical cell may be substantially similar to the electrochemical cell 102 described above with reference to FIG. 1. The metal oxide may comprise a metal oxide to be reduced, such as for example, uranium oxide, titanium monoxide, titanium dioxide, magnesium oxide, zirconium oxide, hafnium oxide, vanadium oxide, niobium oxide, tantalum pentoxide, chromium oxide, molybdenum oxide, tungsten oxide, ruthenium oxide, osmium oxide, rhodium oxide, iridium oxide, iron oxide, cobalt oxide, nickel oxide, silicon oxide, a lanthanide oxide, an actinide oxide, or combinations thereof. In some embodiments, the metal oxide comprises the working electrode of the electrochemical cell. In some such embodiments, the working electrode consists essentially of the metal oxide. In other embodiments, the metal oxide is directly secured to the working electrode, such as in a metal basket. In some such embodiments, the basket may comprise nickel, stainless steel, or another material.

The electrochemical cell may include a molten salt electrolyte that may be substantially similar to those described above with reference to FIG. 1. For example, the molten salt electrolyte may comprise a mixture of lithium chloride and lithium oxide, a mixture of calcium chloride and calcium oxide, a eutectic mixture of sodium chloride and calcium chloride, a eutectic mixture of sodium chloride and potassium chloride, or combinations thereof.

The counter electrode of the electrochemical cell may be substantially similar to the counter electrode materials described above with reference to FIG. 1. In some embodiments, the counter electrode comprises a platinum group metal.

Act 404 may include applying an electric potential between the counter electrode and the working electrode of the electrochemical cell. The electric potential may be selected based on the composition of the molten salt electrolyte. By way of nonlimiting example, where the molten salt electrolyte comprises lithium chloride and lithium oxide, the electric potential (also referred to as the "cathodic potential") may be between about 0.1 V and about 3.1 V, such as between about 0.1 V and about 1.5 V, between about 1.5 V and about 2.0 V, between about 2.0 V and about 2.5 V, between about 2.5 V and about 2.7 V, between about 2.7 V and about 2.9 V, or between about 2.9 V and about 3.1 V. Where the molten salt electrolyte comprises calcium chloride and calcium oxide, the electric (cathodic) potential may be between about 0.1 V and about 3.2 V, such as between about 0.1 V and about 2.0 V, between about 2.0 V and about 2.5 V, between about 2.5 V and about 2.7 V, between about 2.7 V and about 2.9 V, or between about 2.9 V and about 3.2 V. Where the molten salt electrolyte comprises eutectic mixture of sodium chloride and potassium chloride, the electric potential may be between about 0.1 V and about 3.2 V, such as between about 0.1 V and about 2.0 V, between about 2.0 V and about 2.5 V, between about 2.5 V and about 2.7 V, between about 2.7 V and about 2.9 V, or between about 2.9 V and about 3.2 V.

Act 404 may further include maintaining a temperature of the electrochemical cell at or above a melting temperature of the molten salt electrolyte such that the molten salt electrolyte remains in a molten state. By way of nonlimiting example, the molten salt electrolyte may be maintained at a temperature between about 640° C. and about 680° C., such as between about 640° C. and about 660° C. or between about 660° C. and about 680° C. where the molten salt electrolyte comprises $LiCl$—$Li_2O$. In some such embodiments, the molten salt electrolyte may be maintained at a temperature of about 650° C. In embodiments where the molten salt electrolyte comprises $CaCl_2$—$CaO$, the molten salt electrolyte may be maintained at a temperature between about 800° C. and about 950° C., such as between about 800° C. and about 850° C., between about 850° C. and about 875° C., between about 875° C. and about 900° C., or between about 900° C. and about 950° C. Where the molten salt electrolyte comprises sodium chloride and calcium chloride, the molten salt electrolyte may be maintained at a temperature between about 550° C. and about 950° C., such as between about 550° C. and about 600° C., between about 600° C. and about 700° C., between about 700° C. and about 800° C., between about 800° C. and about 900° C., or between about 950° C. and about 950° C. Of course, it is contemplated that the temperature of the molten salt electrolyte may be maintained at a temperature other than the temperatures described above, depending on the composition of the molten salt electrolyte and desired operating conditions.

Act 406 may include reducing metal oxides at the working electrode to form a substantially pure metal or metal alloy. In some embodiments, the metal may exhibit substantially the same composition as the metal oxide of the working electrode, except that the metal or metal alloy may be substantially free of oxygen.

In some embodiments, the pressure within the electrochemical cell may be equal to about ambient pressure (i.e., atmospheric pressure). However, the disclosure is not so limited and the atmospheric pressure of the electrochemical cell may be different than those described above.

Accordingly, in some embodiments, one or more metal oxides may be disposed on or proximate to the working electrode 116 (FIG. 1) of the electrochemical cell 102 (FIG. 1). The counter electrode 114 (FIG. 1) may be selected to comprise a material that is compatible with the molten salt electrolyte 110 (FIG. 1) and does not substantially corrode or wear (e.g., thin) responsive to exposure to the molten salt electrolyte 110.

Without wishing to be bound by any particular theory, it is believed that forming the counter electrode 114 from the materials described herein facilitates operating the electrochemical cell 102 and reducing the metal oxides without substantially degrading or otherwise consuming the counter electrode 114. The counter electrode materials described herein may not substantially react with the molten salt electrolyte, oxide ions, or evolved reactive gases (e.g., selenium, tellurium, and iodine) at operating conditions of the electrochemical cell 102. Accordingly, such materials may maintain structural integrity during operation of the electrochemical cell 102. By way of comparison, conventional counter electrode materials (e.g., platinum, graphite, etc.) may react with at least one of one or more constituents of the molten salt electrolyte, oxide ions, or evolved gases, degrading the conventional counter electrode material.

Advantageously, since the electrochemical cell 102 (FIG. 1) is configured as a direct oxide reduction cell, metal ions of the metal oxide are not substantially dissolved in the molten salt electrolyte 110 (FIG. 1). Accordingly, the metal oxide is reduced to the metal without metal ions dissolving in the molten salt electrolyte 110. Since the metal oxide is not dissolved in the molten salt electrolyte 110, in some embodiments, operation of the electrochemical cell 102 may consume less power than in other conventional electrochemical cells wherein the metal oxide being reduced is dissolved in the molten salt electrolyte. In addition, since the metal oxide is not dissolved, the size and shape of the metal formed may correspond to the size and shape of the metal oxide that is reduced in the electrochemical cell 102.

Without wishing to be bound by any particular theory, it is believed that the counter electrode 114 materials described herein are substantially inert in the electrochemical cell 102 and are not substantially consumed because they do not react with or form complexes or compounds with the molten salt electrolyte 110. By way of nonlimiting example, iridium anode materials do not react in lithium chloride/lithium oxide molten salt electrolytes to form lithium iridate since the formation temperature of lithium iridate is higher than about 750° C. in such molten salts. Similarly, ruthenium counter electrode materials do not react with such molten salt electrolytes to form lithium ruthenate since the formation temperature of lithium ruthenate is higher than 650° C. Similarly, lithium rhodates, including dioxorhodates (e.g., $Li_2RhO_2$) and trioxorhodates (e.g., $Li_2RhO_3$), only form at a temperature greater than about 825° C. Accordingly, such materials can be used in the electrochemical cell 102 (FIG. 1) (e.g., an electrochemical cell with a $LiCl—Li_2O$ molten salt electrolyte having a temperature less than about 825° C.) since they do not form and react with the molten salt electrolyte. In addition, since lithium iridate, lithium ruthenate, and lithium rhodates are not formed at the operating conditions of the electrochemical cell, the counter electrode may comprise lithium iridate, lithium ruthenate, one or more lithium rhodates, or combinations thereof and may be substantially inert in the electrochemical cell.

As another example, calcium ruthenate, strontium ruthenium ternary compounds, calcium iridate, strontium iridate, calcium platinate, and strontium platinate form at high gas pressures (such as at pressures between about 1.0 GPa and about 5.0 GPa) and do not substantially form at operating conditions of an electrochemical cell with either a calcium chloride-calcium oxide or a sodium chloride-calcium chloride molten salt electrolyte. Accordingly, counter electrodes comprising one or more of the materials described above in such molten salt electrolytes may be substantially inert under operating conditions of the electrochemical cell. In addition, counter electrode materials comprising calcium ruthenate, strontium ruthenium ternary compounds, calcium iridate, strontium iridate, calcium platinate, and strontium platinate may be substantially inert in the electrochemical cell, since they form at gas pressures above operating pressures of the electrochemical cell 102 and do not react with the molten salt electrolyte 110 at operating conditions of the electrochemical cell 102.

EXAMPLES

Example 1

An electrolyte comprising 200 g of high purity anhydrous calcium chloride was prepared. Calcium oxide was added to the electrolyte such that the calcium oxide constituted about 1.0 weight percent of the electrolyte. The electrolyte was melted in an alumina/nickel crucible inside a glove box under an argon atmosphere having less than 0.1 ppm moisture and oxygen. A first monolithic counter electrode (anode) comprising a monolithic rod of iridium and a second counter electrode comprising a monolithic rod of ruthenium, a working electrode (cathode) comprising tantalum pentoxide pellets in a basket, and a reference electrode comprising glassy carbon were cleaned in an ultrasonic bath, oven dried, and disposed in the electrochemical cell. The working electrode included about 18.1 weight percent oxygen. The first counter electrode, the second counter electrode, and reference electrode rods had a diameter of about 3.0 mm and a length of about 100 mm. The working electrode was prepared by sintering oxides of tantalum in air or in a reducing atmosphere to form sintered pellets. The sintered pellets were cylindrical in shape and had a diameter between about 13.0 mm and about 15.0 mm and a length between about 1.0 mm and about 5.0 mm. The first counter electrode, the second counter electrode, the working electrode, and reference electrode were sheathed in high purity alumina tubes.

Figure 5:
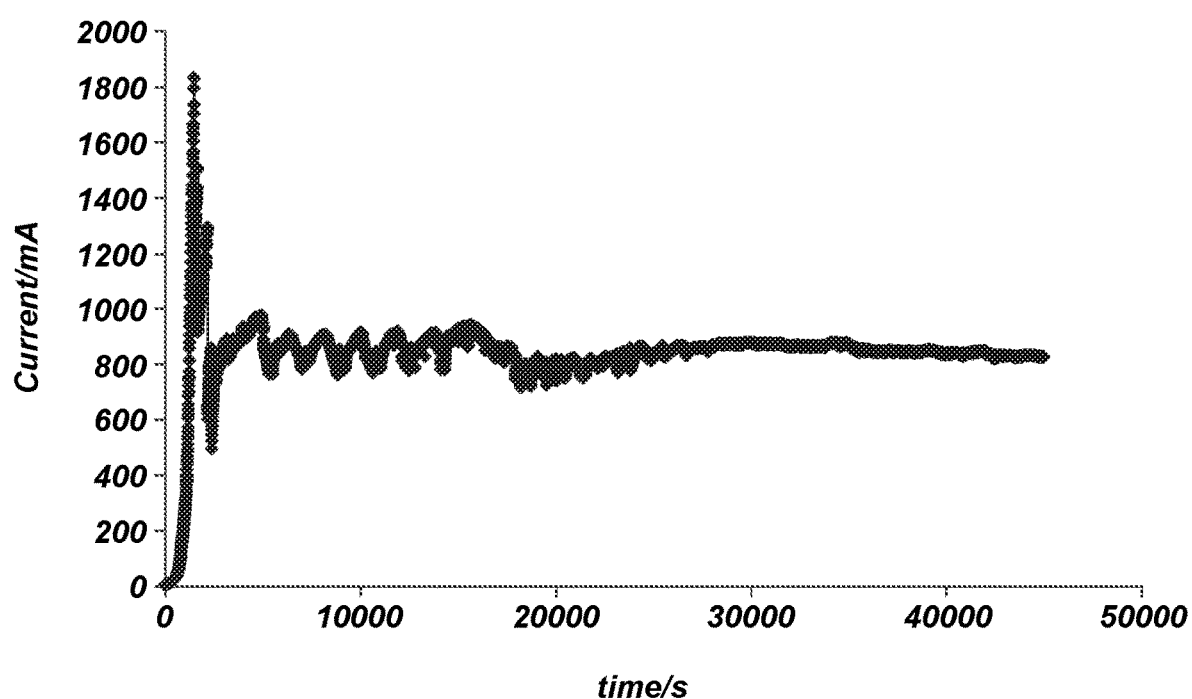
FIG. 5 is a graph showing a relationship between a measured current as a function of time in an electrochemical cell, in accordance with an embodiment of the disclosure.

The electrolyte was heated in a furnace to melt the electrolyte and form a molten salt electrolyte. The molten salt electrolyte was maintained at a temperature between about 800° C. and about 950° C. The first counter electrode, the second counter electrode, the working electrode, and the reference electrode were disposed in the electrochemical cell such that the lower portions of the respective electrodes were in contact with the molten salt electrolyte. The cell voltage was controlled between about 2.5 V and about 3.0 V. The current was measured as a function of time, as illustrated in the graph of FIG. 5. The electrochemical cell was operated inside an argon atmosphere in a glove box.

As illustrated in FIG. 5, the initial current measured exhibited a sharp rise before declining over time. The initial peak in the current is due to the non-conducting nature of the metal oxide and the reduction in current correlates to the reduction of the metal oxide to a conducting metal.

The residual oxygen content of the metal oxide was measured with a LECO analyzer. The metal oxide was reduced by about 98.9%. In other words, after the electrochemical reaction, the metal oxide had less than about 2,000 ppm oxygen, indicating a reduction in oxygen content of about 98.9%. Stated another way, the metal oxide was reduced and included about 0.2 weight percent oxygen.

The first counter electrode and second counter electrode were visually inspected to record the occurrence of any possible mechanical degradation such as cracking, thinning, corrosion, erosion, or necking. No mechanical degradation was observed in the anodes.

Example 2

A first counter electrode (anode) comprising platinum was disposed in an electrochemical cell including a molten salt electrolyte comprising lithium chloride and lithium oxide. The electrochemical cell included depleted uranium oxide disposed in a working electrode (cathode) basket which was in contact with the cathode lead. A second iridium counter electrode was disposed in the same electrochemical cell. The electrochemical cell was in an argon atmosphere in a glove box.

A current was applied between and the single cathode and each of the platinum counter electrode and the iridium counter electrode and the metal oxide was reduced in the electrochemical cell. After the metal oxide was substantially reduced, both the platinum counter electrode and the iridium counter electrode were removed and analyzed for mechanical degradation and thinning. The platinum counter electrode exhibited a reduction in diameter of about 17 percent. The iridium counter electrode exhibited a reduction in diameter of less than about 1 percent. Accordingly, the iridium counter electrode exhibited substantially less thinning than the platinum counter electrode.

Example 3

A first counter electrode (anode) comprising monolithic iridium and a second counter electrode (anode) comprising monolithic ruthenium were disposed in an electrochemical cell including a molten salt electrolyte comprising lithium chloride and lithium oxide. The first counter electrode and the second counter electrode comprised rods with a diameter of 3.0 mm and a length of about 100 mm.

The molten salt electrolyte comprised about 1.0 weight percent lithium oxide. The temperature of the molten salt electrolyte was about 650° C. The electrochemical cell included about 100 grams of unirradiated depleted uranium oxide ($UO_2$) disposed in a stainless steel basket which was in contact with the cathode lead. The electrochemical cell was in an argon atmosphere in a glove box.

A current was applied between the single cathode and each of the first counter electrode (monolithic iridium) and the second counter electrode (monolithic ruthenium) and the uranium oxide was reduced in the electrochemical cell. After about 80 hours, both the first counter electrode and the second counter electrode were removed and analyzed for mechanical degradation and thinning. No perceptible mechanical degradation was observed in either of the first counter electrode or the second counter electrode. Accordingly, the first counter electrode and the second counter electrode exhibited substantially less thinning than a platinum electrode (such as the platinum electrode of Example 2).

Example 4

An electrochemical cell comprising a molten salt electrolyte including a mixture of LiCl and about 1.0 weight percent $Li_2O$, about 0.1 weight percent $Na_2Se$, about 0.1 weight percent $Li_2Te$, and about 0.1 weight percent LiI was prepared. The working electrode (cathode) of the electrochemical cell included pellets and/or chunks of titanium monoxide, manganese oxide, and nickel oxide (NiO) packed into a stainless steel basket. The stainless steel basket was in electrical communication with the working electrode through a stainless steel wire used as the working electrode current collector. Three counter electrode (anodes) were disposed in the electrochemical cell: one counter electrode comprising monolithic iridium; one counter electrode comprising monolithic ruthenium; and one counter electrode comprising monolithic platinum. The counter electrodes each had a diameter of about 3.0 mm and a length of about 100.0 mm. The electrochemical cell was operated to reduce the oxides in the stainless steel basket. Selenium, tellurium, and iodine gases evolved during operation of the electrochemical cell. After the metal oxides in the stainless steel basket were reduced, the counter electrodes were inspected. The platinum counter electrode exhibited significant thinning (e.g., necking), while the ruthenium counter electrode and the iridium counter electrode did not exhibit any detectable material loss.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. An electrochemical cell, comprising:
    a counter electrode including at least one inert material consisting of lithium ruthenate or a lithium rhodate;
    a working electrode comprising a metal oxide to be reduced in the electrochemical cell; and
    a molten salt electrolyte comprising a molten salt comprising at least one of an alkali halide salt and an alkaline earth metal halide salt.

2. The electrochemical cell of claim 1, further comprising a reference electrode comprising nickel, nickel/nickel oxide, glassy carbon, silver/silver chloride, one or more platinum group metals, one or more precious metals, or combinations thereof and configured to control a cell potential between the counter electrode and the working electrode.

3. The electrochemical cell of claim 1, wherein the working electrode comprises uranium oxide.

4. The electrochemical cell of claim 3, wherein the molten salt electrolyte comprises at least one mixture comprising lithium chloride and lithium oxide, calcium chloride and calcium oxide, or calcium chloride, sodium chloride, and calcium oxide.

5. The electrochemical cell of claim 1, wherein the working electrode comprises at least one of titanium monoxide, nickel oxide manganese oxide, and tantalum pentoxide.

6. The electrochemical cell of claim 1, wherein the counter electrode further comprises a substrate substantially surrounded by the at least one inert material of the counter electrode, the substrate comprising a material selected from the group consisting of high density graphite, molybdenum, tantalum, titanium, chromium, tungsten, nickel, and combinations thereof.

7. The electrochemical cell of claim 1, wherein the working electrode comprises enriched uranium oxide.

8. The electrochemical cell of claim 1, wherein the molten salt electrolyte comprises at least one of lithium chloride, lithium oxide, calcium chloride, calcium oxide, and sodium chloride.

9. The electrochemical cell of claim 1, wherein the counter electrode further comprises a substrate material selected from the group consisting of high density graphite, molybdenum, tantalum, titanium, nickel, chromium, tungsten, and combinations thereof, wherein the substrate material is coated with the at least one inert material.

10. The electrochemical cell of claim 1, wherein the working electrode comprises at least one of uranium oxide, tantalum pentoxide, titanium monoxide, titanium dioxide, zirconium oxide, hafnium oxide, tungsten oxide, chromium oxide, molybdenum oxide, iron oxide, nickel oxide, samarium oxide, and silicon oxide.

11. The electrochemical cell of claim 1, wherein the working electrode comprises at least one of at least one lanthanide oxide and at least one actinide oxide.

12. The electrochemical cell of claim 1, wherein the molten salt comprises one or more of at least one chloride salt and at least one bromide salt.

13. The electrochemical cell of claim 1, wherein the metal oxide comprises selenium, tellurium, or iodine.

14. The electrochemical cell of claim 1, wherein the at least one inert material consists of lithium ruthenate.

15. A method of direct oxide reduction, the method comprising:
    forming a molten salt electrolyte in an electrochemical cell comprising at least one of an alkali halide salt and an alkaline earth metal halide salt;
    disposing a working electrode comprising at least one metal oxide in the electrochemical cell;
    disposing a counter electrode consisting of lithium ruthenate or a lithium rhodate in the electrochemical cell; and
    applying a current between the counter electrode and the working electrode to reduce the at least one metal oxide.

16. The method of claim 15, wherein forming a molten salt electrolyte in the electrochemical cell comprises forming the molten salt electrolyte from one or more of at least one chloride salt and at least one bromide salt.

17. The method of claim 15, wherein disposing a working electrode comprising at least one metal oxide in the electrochemical cell comprises forming the working electrode of the electrochemical cell from at least one of uranium oxide, tantalum pentoxide, titanium monoxide, titanium dioxide, zirconium oxide, hafnium oxide, tungsten oxide, chromium oxide, molybdenum oxide, iron oxide, nickel oxide, neodymium oxide, samarium oxide, and silicon oxide.

18. The method of claim 15, wherein disposing a working electrode comprising at least one metal oxide in the electrochemical cell comprises forming the working electrode of the electrochemical cell from at least one of at least one lanthanide oxide and at least one actinide oxide.

19. The method of claim 15, wherein:
    disposing a working electrode comprising at least one metal oxide in the electrochemical cell comprises disposing more than one metal oxide in the electrochemical cell; and
    reducing the at least one metal oxide comprises reducing the more than one metal oxide to form a metal alloy.

20. An electrochemical cell, comprising:
    a counter electrode consisting of a lithium tin oxygen compound or $Li_2MnO_3$;
    a working electrode comprising a metal oxide to be reduced in the electrochemical cell; and
    a molten salt electrolyte comprising a molten salt comprising at least one of an alkali halide salt and an alkaline earth metal halide salt.

* * * * *